US011150812B2

(12) United States Patent
Basu (10) Patent No.: US 11,150,812 B2
(45) Date of Patent: Oct. 19, 2021

(54) PREDICTIVE MEMORY MANAGEMENT (71) Applicant: Micron Technology, Inc., Boise, ID (US)

(72) Inventor: Reshmi Basu, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 79 days.

(21) Appl. No.: 16/545,372

(22) Filed: Aug. 20, 2019

(65) Prior Publication Data

US 2021/0055868 A1 Feb. 25, 2021

(51) Int. Cl.
*G06F 3/06* (2006.01)
(52) U.S. Cl.
CPC .......... *G06F 3/0617* (2013.01); *G06F 3/0632* (2013.01); *G06F 3/0673* (2013.01)
(58) Field of Classification Search
CPC ..... G11C 16/28; G11C 16/344; H03M 13/356
See application file for complete search history.

(56) References Cited

U.S. PATENT DOCUMENTS

| 7,681,089 | B2 | 3/2010 | Ashmore |
| 8,037,380 | B2 | 10/2011 | Cagno et al. |
| 8,266,496 | B2 | 9/2012 | Flynn et al. |
| 8,473,779 | B2 | 6/2013 | Siewert et al. |
| 2006/0291304 | A1 | 12/2006 | Rothman et al. |
| 2010/0226183 | A1* | 9/2010 | Kim ..................... G11C 16/344 365/185.33 |
| 2012/0072768 | A1 | 3/2012 | Morris et al. |

| 2012/0203951 | A1* | 8/2012 | Wood ..................... G11C 16/28 711/102 |
| 2013/0339574 | A1* | 12/2013 | Franceschini ....... G06F 12/0292 711/103 |
| 2014/0281260 | A1* | 9/2014 | Peterson ............... G06F 11/008 711/135 |

(Continued)

FOREIGN PATENT DOCUMENTS

EP 1956485 B1 5/2010

OTHER PUBLICATIONS

International Search Report and Written Opinion from related PCT Application No. PCT/US2020/046730, dated Nov. 20, 2020, 10 pages.

*Primary Examiner* — Prasith Thammavong
*Assistant Examiner* — Trang K Ta
(74) *Attorney, Agent, or Firm* — Brooks, Cameron & Huebsch, PLLC (57) ABSTRACT

Systems, apparatuses, and methods related to predictive memory management are described. Error correction operations can be performed on a memory system and can include a latency associated with performing various error correction techniques on data and the health of physical addresses used to store the data can be predicted based on that latency information. In an example, a method can include determining, by a controller, latency information corresponding to one or more error correction operations performed on data received by the controller, and assigning, based on the latency information corresponding to a health of physical address locations corresponding to the data, and taking an action involving the physical address locations based, at least in part, on the information corresponding to the health of the plurality of physical address locations corresponding to the data.

22 Claims, 5 Drawing Sheets

(56) References Cited

U.S. PATENT DOCUMENTS

| | | |
|---|---|---|
| 2015/0243373 A1 | 8/2015 | Chun et al. |
| 2016/0196179 A1* | 7/2016 | Zhao ................... H03M 13/356 714/764 |
| 2017/0271031 A1* | 9/2017 | Sharon ................ G06F 11/3058 |
| 2018/0232274 A1 | 8/2018 | Hashimoto et al. |
| 2018/0366210 A1 | 12/2018 | Park |
| 2019/0171381 A1* | 6/2019 | Ioannou ................ G06F 3/0604 |
| 2019/0278498 A1* | 9/2019 | Dedrick ................ G06F 3/0631 |
| 2020/0409578 A1* | 12/2020 | Brittner ................ G06F 3/0679 |

\* cited by examiner

PREDICTIVE MEMORY MANAGEMENT

TECHNICAL FIELD

The present disclosure relates generally to semiconductor memory and methods, and more particularly, to apparatuses, systems, and methods for predictive memory management.

BACKGROUND

Memory devices are typically provided as internal, semiconductor, integrated circuits in computers or other electronic systems. There are many different types of memory including volatile and non-volatile memory. Volatile memory can require power to maintain its data (e.g., host data, error data, etc.) and includes random access memory (RAM), dynamic random access memory (DRAM), static random access memory (SRAM), synchronous dynamic random access memory (SDRAM), and thyristor random access memory (TRAM), among others. Non-volatile memory can provide persistent data by retaining stored data when not powered and can include NAND flash memory, NOR flash memory, and resistance variable memory such as phase change random access memory (PCRAM), resistive random access memory (RRAM), and magnetoresistive random access memory (MRAM), such as spin torque transfer random access memory (STT RAM), among others.

Memory devices can be coupled to a host (e.g., a host computing device) to store data, commands, and/or instructions for use by the host while the computer or electronic system is operating. For example, data, commands, and/or instructions can be transferred between the host and the memory device(s) during operation of a computing or other electronic system.

DETAILED DESCRIPTION

Systems, apparatuses, and methods related to predictive memory management are described. Error correction operations can be performed on a memory system. Latency information derived from the error correction operations can be used to predict a health of physical addresses used to store data in a memory system. For instance, multiple tiers and/or levels of error correction can be performed on the data based on characteristics of the error correction utilized at each tier and/or level. One such characteristic can include a latency associated with performing various error correction techniques on data and the health of physical addresses used to store the data can be predicted based on that latency information. In an example, a method can include determining, by a controller, latency information corresponding to one or more error correction operations performed on data received by the controller, and assigning, based on the latency information corresponding to a health of physical address locations corresponding to the data, and taking an action involving the physical address locations based, at least in part, on the information corresponding to the health of the plurality of physical address locations corresponding to the data.

Memory devices, such as flash memory devices, can be used to store data in a computing system and can transfer such data between a host associated with the computing system. The data stored in a memory device can be important or even critical to operation of the computing system. Flash memory devices are utilized as non-volatile memory for a wide range of electronic applications. Flash memory devices typically use a one-transistor memory cell that allows for high memory densities, high reliability, and low power consumption. The data stored in the memory device can contain errors that are correctable using error correction logic. Sometimes an error in the data is uncorrectable and reporting an uncorrectable error to the host should be avoided.

Two common types of flash memory array architectures are the "NAND" and "NOR" architectures, so called for the logical form in which the basic memory cell configuration of each is arranged. In the NOR array architecture, the floating gate memory cells of the memory array are typically arranged in a matrix.

The gates of each floating gate memory cell of the array matrix are typically coupled by rows to word select lines and their drains are coupled to column bit lines. The NOR architecture floating gate memory array is accessed by a row decoder activating a row of floating gate memory cells by selecting the word select line coupled to their gates. The row of selected memory cells then place their data values on the column bit lines by flowing different currents depending on if a particular cell is in a programmed state or an erased state.

A NAND array architecture also arranges its array of floating gate memory cells in a matrix such that the gates of each floating gate memory cell of the array are coupled by rows to word select lines. However, each memory cell is not directly coupled to a column bit line by its drain. Instead, the memory cells of the array are coupled together in series, source to drain, between a source line and a column bit line.

Memory cells in a NAND array architecture can be configured, e.g., programmed, to a desired state. That is, electric charge can be placed on or removed from the floating gate of a memory cell to put the cell into a number of stored states. For example, a single level cell (SLC) can represent two binary states, e.g., 1 or 0. Flash memory cells can also store more than two binary states, e.g., 00, 01, 10, or 11. Such cells can be referred to as multi state memory cells, multibit cells, or multilevel cells (MLCs). MLCs can allow the manufacture of higher density memories without increasing the number of memory cells since each cell can represent more than one bit. MLCs can have more than one programmed state, e.g., a cell capable of representing two bits can have three programmed states and an erased state.

Reading of memory cells can be accomplished by applying an appropriate voltage to the control gate and the drain and comparing the drain to source current, which can indicate the voltage threshold (Vt) of the cell, against a reference current, e.g., a "trip point," to determine the state of the memory cell. In an example data read operation, 0 volts can be applied to a selected word line, e.g., to the control gate of a cell or cells in the selected word line. A read pass voltage of about 5 volts can be applied to unselected word lines, e.g., to the control gates of cells in the unselected word lines. The drain to source current, e.g., the "cell current," or "drain current," flowing through cells on the selected word line, is indicative of the binary logic state of the cell.

When the cell current of a particular memory cell is above the trip point, the memory cell is read as having a particular state, e.g., an erased state or a programmed state. When the cell current of the particular memory cell is below the trip point, the memory cell is read as having a different state. Therefore, a desired configured state of the memory cell, e.g., 00, 01, 10, or 11, depends on whether the cell current is above or below the trip point.

Memory cells having a state other than their desired/expected configured state, e.g., the state into which they were programmed, represent data errors in data being read. Many memory devices employ an error checking technique such as correction code (ECC) checking to detect bit errors in data, e.g., cells having incorrect states. The ECC schemes can be associated with groups of cells, e.g., memory blocks, memory segments, or memory sectors, and can reduce read failures by detecting and possibly correcting bit errors. Examples of ECC schemes include, Hamming codes, Reed-Solomon (RS) codes, Bose-Chaudhuri-Hochquenghem (BCH) codes, circular redundancy check (CRC) codes, Golay codes, Reed-Muller codes, Goppa codes, neighbor-cell assisted error correction codes, low density parity check (LDPC) error correction codes, and Denniston codes, among others.

Read failures occur when accessed data bits, e.g., memory cells representing information retrieved by a processor, have incorrect states, and/or the physical addresses associated with the data are worn, or otherwise not operating correctly. Reducing read failures increases the operational reliability of memory devices and/or systems. Error checking/correcting techniques may not be able to correct some erroneous bits. Data that includes uncorrectable error can cause harm, waste resources, and/or cause failure in the host, for these reasons, transmitting data with uncorrectable error should be avoided. Furthermore, many error checking techniques can be unsuccessfully applied to the data, even when repeated, and data having an uncorrectable error can be transmitted to the host.

In some approaches, these and other error checking techniques are performed on the memory device by, for example, a controller located on the memory device. The memory device controller can be a media controller such as a non-volatile memory express (NVMe) controller that is tightly coupled to the memory device (e.g., the memory cells, blocks, sectors, etc. of the memory device).

As a result, in approaches in which error correction is performed on the memory device (e.g., using a controller or other circuitry resident on the memory device), the data can be read multiple times and error can be detected and uncorrectable. Said differently, erroneous bits present in the data may not be accurately corrected, which can lead to incorrect data being provided to the host or, in some cases, cause failure of the computing system. As used herein, the term "resident on" refers to something that is physically located on a particular component. For example, the error correction being performed "resident on" the memory device refers to a condition in which the error correction is physically performed on the memory device. The term "resident on" can be used interchangeably with other terms such as "deployed on" or "located on," herein.

As storage capability of memory devices increases, these effects can become more pronounced as more and more data are able to be stored by the memory device thereby increasing the quantity of erroneous bits introduced to the data. These effects can be further exacerbated by the limitations of some approaches to error correction provided on memory devices described above, especially as the amount of data stored in memory devices and the speed at which data retrieval is expected.

In contrast, embodiments herein are directed to mitigate propagation of data containing errors, or data that is likely to contain errors, by predicting an amount of wear corresponding to physical locations in which the data are stored. The prediction of an amount of wear on the data can be based, at least in part on latency information derived from the error correction operations. When an uncorrectable error is identified, and/or the predicted wear of the data indicates an uncorrectable error (or a heightened likelihood that data associated with particular physical address spaces of the memory device could contain greater than a threshold quantity of uncorrectable errors), the controller can indicate (e.g., alert) the host such that data can be saved before it is unable to be recovered. To facilitate performance of the operations described herein, the memory device can include specialized circuitry (e.g., hardware, logic, integrated circuits, etc.) in the form of an error correction component to perform error correction operations on data received from the memory device. For example, in some embodiments, multiple levels of error correction logic can be included in the error correction component resident on a controller of a memory device. The multiple levels of error correction can be performed on data by the memory device, and latency information can be determined after each error correction operation is performed to predict an amount of wear corresponding to a physical address space from which the data was accessed.

Embodiments herein can allow for read latencies to be determined based on one or more read and/or error correction iterations performed on the data. Each read latency is associated with a residual bit error rate (RBER) and each iteration of the error correction operation can reduce the RBER by a factor. As a result, in some embodiments, the memory device can perform error correction operation(s) on data using an initial error correction logic and, based on the determined read latencies, take an action involving one more physical address locations corresponding to the data. The actions taken by the memory device can include predicting an amount of wear corresponding to physical address locations in which the data was or is stored, retiring a physical address space based on the amount of predicted wear associated with the physical address space, predict a remaining quantity of data transfer cycles left for the physical address locations in which the data was or is stored, or a combination thereof. After determining the read latencies, the memory device can perform subsequent error correction operations using a subsequent error correction logic. By performing multiple error correction operations using different error correction logics, data can be corrected or determined to be uncorrectable and reported to the host as such.

As used herein, "initial error correction operations" refer to error correction operations that are performed on raw data that has not had an error correction operation of any kind performed on it. Multiple iterations of an initial error correction can be implemented to data. For example, an initial error correction operation can include an operation to correct errors on data stored by a memory system or memory device that arise as a result of the nature of the storage characteristics of the memory system or memory device. Initial error correction operations are distinguished from subsequent error correction operations in which data incurs one or more subsequent error correction operations to detect or correct residual errors (e.g., undetectable and/or uncorrectable errors) that can be present in data subsequent to performance of an initial error correction operation.

In some approaches, a memory device can perform subsequent error correction operations such as operations to detect and/or correct undetectable and/or uncorrectable errors that are present in data subsequent to error correction by the memory device. The subsequent error correction operation can be a different technique of error correction and latency information can be determined after each iteration of the subsequent error correction to predict a health of the data and/or the physical addresses associated with the data. In this way, the memory device can minimize a quantity of uncorrectable errors that are propagated through a computing system and thereby reduce a quantity of uncorrectable errors reported to the host device by taking an action (e.g., predicting an amount of wear corresponding to the data) based in part on the determined latencies. In this way, error can be corrected using multiple types of error correction techniques, and the health of the information corresponding to the data can be determined.

In the following detailed description of the present disclosure, reference is made to the accompanying drawings that form a part hereof, and in which is shown by way of illustration how one or more embodiments of the disclosure can be practiced. These embodiments are described in sufficient detail to enable those of ordinary skill in the art to practice the embodiments of this disclosure, and it is to be understood that other embodiments can be utilized and that process, electrical, and structural changes can be made without departing from the scope of the present disclosure.

As used herein, designators such as "N," "M," "P," "S," "R," etc., particularly with respect to reference numerals in the drawings, indicate that a number of the particular feature so designated can be included. It is also to be understood that the terminology used herein is for the purpose of describing particular embodiments only, and is not intended to be limiting. As used herein, the singular forms "a," "an," and "the" can include both singular and plural referents, unless the context clearly dictates otherwise. In addition, "a number of," "at least one," and "one or more" (e.g., a number of memory devices) can refer to one or more memory devices, whereas a "plurality of" is intended to refer to more than one of such things. Furthermore, the words "can" and "may" are used throughout this application in a permissive sense (i.e., having the potential to, being able to), not in a mandatory sense (i.e., must). The term "include," and derivations thereof, means "including, but not limited to." The terms "coupled," and "coupling" mean to be directly or indirectly connected physically or for access to and movement (transmission) of commands and/or data, as appropriate to the context. The terms "data" and "data values" are used interchangeably herein and can have the same meaning, as appropriate to the context.

The figures herein follow a numbering convention in which the first digit or digits correspond to the figure number and the remaining digits identify an element or component in the figure. Similar elements or components between different figures can be identified by the use of similar digits. For example, 106 can reference element "06" in FIG. 1, and a similar element can be referenced as 206 in FIG. 2. A group or plurality of similar elements or components can generally be referred to herein with a single element number. For example, a plurality of reference elements 112-1, . . . , 112-P (e.g., 112-1 to 112-P) can be referred to generally as 112. As will be appreciated, elements shown in the various embodiments herein can be added, exchanged, and/or eliminated so as to provide a number of additional embodiments of the present disclosure. In addition, the proportion and/or the relative scale of the elements provided in the figures are intended to illustrate certain embodiments of the present disclosure and should not be taken in a limiting sense.

Figure 1:
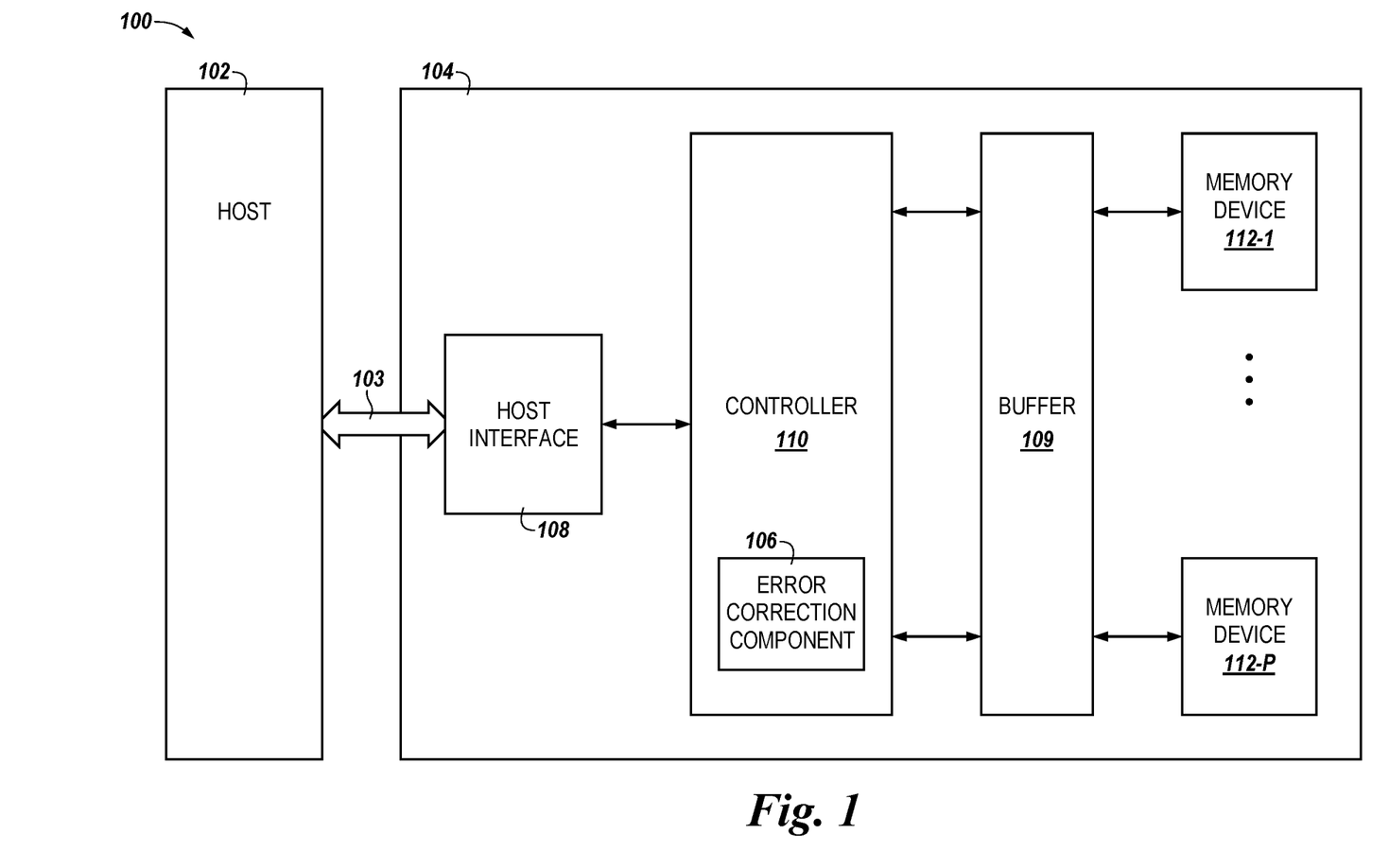
FIG. 1 is a functional block diagram in the form of a computing system including an apparatus including a memory system in accordance with a number of embodiments of the present disclosure.
Figure 2A:
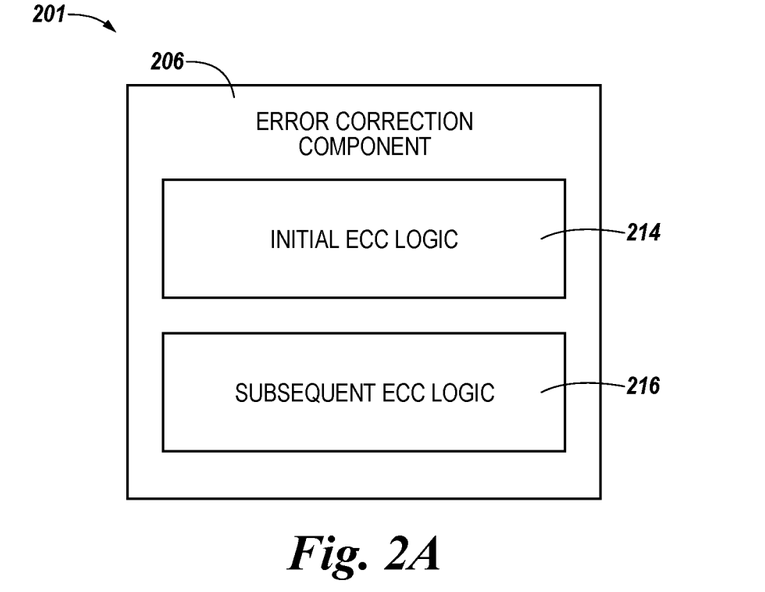
FIG. 2A is a functional block diagram in the form of an apparatus including an error correction component in accordance with a number of embodiments of the present disclosure.

FIG. 1 is a functional block diagram in the form of a computing system 100 including an apparatus including a memory system 104 in accordance with a number of embodiments of the present disclosure. As used herein, an "apparatus" can refer to, but is not limited to, any of a variety of structures or combinations of structures, such as a circuit or circuitry, a die or dice, a module or modules, a device or devices, or a system or systems, for example. The memory system 104 can be a solid-state drive (SSD), for instance, and can include a host interface 108, a buffer 109, a controller 110, e.g., a processor and/or other control circuitry, and a number of memory devices 112-1 to 112-P, e.g., solid state memory devices such as NAND flash devices, which provide a storage volume for the memory system 104. In a number of embodiments, the controller 110, a memory device 112-1 to 112-P, and/or the host interface 108 can be physically located on a single die or within a single package, e.g., a managed NAND application. Also, in a number of embodiments, a memory, e.g., memory devices 112-1 to 112-P, can include a single memory device.

As illustrated in FIG. 1, the controller 110 can be coupled to the host interface 108 and to the memory devices 112-1 to 112-P via one or more channels and can be used to transfer data between the memory system 104 and a host 102. The host interface 108 can be in the form of a standardized interface. For example, when the memory system 104 is used for data storage in a computing system 100, the interface 108 can be a serial advanced technology attachment (SATA), peripheral component interconnect express (PCIe), or a universal serial bus (USB), a double data rate (DDR) interface, among other connectors and interfaces. In general, however, interface 108 can provide an interface for passing control, address, data, and other signals between the memory system 104 and a host 102 having compatible receptors for the host interface 108.

The host 102 can be a host system such as a personal laptop computer, a desktop computer, a digital camera, a mobile telephone, an internet-of-things (IoT) enabled device, or a memory card reader, graphics processing unit (e.g., a video card), among various other types of hosts. The host 102 can include a system motherboard and/or backplane and can include a number of memory access devices, e.g., a number of processing resources (e.g., one or more processors, microprocessors, or some other type of controlling circuitry). One of ordinary skill in the art will appreciate that "a processor" can intend one or more processors, such as a parallel processing system, a number of coprocessors, etc. The host 102 can be coupled to a host interface 108 of the memory system 104 by a communication channel 103.

The buffer 109 can be included on the memory system 104 and be a portion of physical memory storage used to temporarily store data while it is being moved from the memory devices 112-1 to 112-P to the controller 110. In some embodiments, the host 102 can be responsible for executing an operating system for a computing system 100 that includes the memory system 104. Accordingly, in some embodiments, the host 102 can be responsible for controlling operation of the memory system 104. For example, the host 102 can execute instructions (e.g., in the form of an operating system) that manage the hardware of the computing system 100 such as scheduling tasks, executing applications, controlling peripherals, etc.

The computing system 100 can include separate integrated circuits or the host 102, the memory system 104, the error correction component 106, the buffer 109, the host interface 108, the controller 110, and/or the memory devices 112-1 to 112-P can be on the same integrated circuit. The computing system 100 can be, for instance, a server system and/or a high-performance computing (HPC) system and/or a portion thereof. Although the example shown in FIG. 1 illustrate a system having a Von Neumann architecture, embodiments of the present disclosure can be implemented in non-Von Neumann architectures, which may not include one or more components (e.g., CPU, ALU, etc.) often associated with a Von Neumann architecture.

In some approaches, the memory system 104 (e.g., the controller 110), can use one or more error checking techniques such as an error correction code (ECC) to determine whether data (e.g., a memory cell and/or a group of cells, e.g., a data word, or sector) stored in the memory devices 112-1 to 112-P, is erroneous, e.g., has an incorrect state. An erroneous or incorrect state can refer to a state of a memory cell other than the one into which it was programmed or written. For example, non-volatile memory cells can be programmed into a particular logic state, e.g., 1 or 0, and can undergo a program verify operation to confirm that the cell was programmed to the desired correct state. In such approaches, if erroneous bits are detected, error correction operations can be performed on the data by the memory system 104.

The controller 110 can include an error correction component 106, which can use one or more error checking techniques such as ECC to determine whether data (e.g., a memory cell and/or a group of cells, e.g., a data word, or sector) of the memory devices 112-1 to 112-P, is erroneous. The error correction component 106 can include, for example, a number of components in the form of hardware and/or firmware, e.g., one or more integrated circuits, and/or software for performing error correction operations on data received by the host 102 from the memory system 104. The error correction component 106 can include one or more sub-components, such as the initial ECC logic (e.g., encode component) 214 and/or the subsequent ECC logic (e.g., encode component) 216 illustrated and described in connection with FIG. 2, herein.

The error correction component 106 can include ECC logic (e.g., hardware and/or firmware) to perform error correction operations according to schemes such as Hamming codes, RS codes, BCH codes, CRC codes, Golay codes, Reed-Muller codes, Goppa codes, neighbor-cell assisted error correction codes, LDPC error correction codes, and Denniston codes, and/or other type of error correction scheme for instance, which can facilitate error correction on data transferred between the memory devices 112-1 to 112-P and the host 102.

In some embodiments, the error correction component 106 can receive data from the memory devices 112-1 to 112-P via the buffer 109. The data can be encoded according to one or more ECC schemes prior to being transferred from the memory device 112-1 to 112-P to the buffer 109 and, ultimately, the error correction component 106. For example, the controller 110 and/or the memory device 112-1 to 112-P can, in some embodiments, encode the data according to one or more ECC schemes prior to transferring the data to the error correction component 106. If the error correction component 106 receives data that has been previously encoded according to one or more ECC schemes by the memory system 104, the error correction component 106 can decode the data according to one or more ECC schemes as part of performance of an error correction operation.

Embodiments are not so limited, however, and in some embodiments, the error correction component 106 can receive unencoded data from the memory devices 112-1 to 112-P and encode and/or subsequently decode the data according to one or more ECC schemes. As a result, the error correction component 106 can be responsible for performing all (or at least a portion of) error correction operations for the computing system 100. That is, in some embodiments, error correction on data can be performed by the memory system 104 by the error correction component 106 that is resident on (e.g., tightly coupled to) the host 102.

For example, the controller 110 can determine the latency information by comparing the first timestamp and/or the second timestamp to the initial timestamp and assign, based on the latency information, information corresponding to a health of the physical address locations corresponding to the data. Read latencies can be associated with a RBER and can be determined and used to predict the health of data and/or physical addresses associated with the data. In some embodiments, the controller 110 can monitor the health of the data received from the memory devices 112-1 to 112-P via the buffer 109. The health of the data can refer to a quantity of errors (e.g., bit flip errors, uncorrectable errors, etc.) present in the data, a quantity of error correction operations performed on the data, and/or a predicted remaining quantity of data transfer cycles left for the physical address location which can be based at least in part on the latency information. The controller 110 can determine latency information from determining a difference in timestamps corresponding to error correction operations performed by the controller 110. Latency information can be determined after each error correction operation, and the health of the physical address locations can be determined based in part on the latency information determined after each error correction operation.

The controller 110 can be coupled to the memory devices 112 via the buffer 109. The buffer 109 can be a temporary storage component for the data prior to the data being read by the controller. The controller 110 can include an error correction component 106 resident thereon and the controller 110 can be configured to perform using the error correction component 106, an initial error correction operation on data corresponding to physical address locations of the memory device. The controller can determine read latencies based on timestamps assigned to the error correction operations. For example, the controller 110 can assign an initial timestamp when the data is initially read and can assign a first timestamp to an initial error correction operation and perform, using error correction logic present on the error correction component 106, a subsequent error correction operation. The controller 110 can assign a second timestamp to the subsequent error correction operation. The controller can determine latency information corresponding to the initial and subsequent error correction operations, based at least in part, on the first and second timestamp.

Based on the determined latency information, the controller 110 can take an action involving the physical address locations based, at least in part on the information corresponding to the health of the physical address locations corresponding to the data. In some embodiments, the controller 110 take an action such as predicting an amount of wear corresponding to a physical address location corresponding to the data and retiring the physical address location corresponding to the data, based in part on the amount of wear predicted. In other embodiments, the controller 110 can take an action by predicting a remaining quantity of data transfer cycles left for the physical address locations, based at least in part on the latency information. Predicting the remaining quantities of data transfer cycles can include retiring the physical address locations following the last data transfer cycle of the quantity of data transfer cycles predicted. The controller 110 can use this predicted health to initiate one or more read operations, one or more iterations of error correction using ECC logic corresponding to a first level, and/or one or more subsequent iterations of error correction operations using ECC logic corresponding to a subsequent level of error correction.

The controller 110 can initiate performance of an error correction operation in response to a determination by the controller 110 that the data was/is received by the buffer 109 (coupled to the controller 110). For example, in response to a determination by the controller 110 that data has been received from the buffer 109, the controller 110 can assign an initial timestamp and can perform, using error correction logic resident on the error correction component 106, an initial error correction operation that provides a first level of error correction and assign a first timestamp to the initial error correction operation. The timestamp can be a period of time between the initial timestamp (when the data is received by the controller 110 from the memory device 112-1 to 112-P and/or the buffer 110) and when the data has been read by the controller 110. The latency information determined by the controller 110 from the first timestamp can be used to determine whether to perform a subsequent error correction operation.

In the above example, the controller 110, using the error correction logic resident on the error correction component 106 can perform a subsequent error correction operation that corresponds to the first level or error correction. The controller 110 can assign a second timestamp to the subsequent error correction operation, and, determine latency information corresponding to the initial and subsequent error correction operations, based, at least in part, on the first and/or second timestamp. Using these methods, the controller 110 and/or the error correction component 106 can determine if the data has an uncorrectable error, if the data to be corrected requires a different level of error correction, and/or predict a health of the physical address locations associated with the data that is experiencing error correction operations.

The controller 110 can be configured to determine that the information corresponding to the health of the physical address locations associated with the data is indicative of one or more of the physical address locations experiencing a failure within a particular quantity of subsequent data cycles; and retire the plurality of physical address locations based on a determined likelihood that the one or more of the physical address locations will experience the failure within the particular quantity of subsequent data cycles the assigned health information. In other words, the controller 110 can perform, using an error correction logic resident on the error correction component 106 that provides a second level of error correction, a different error correction operation, based at least in part, on the latency information (e.g., the predicted health of the data).

As mentioned, the error correction component 106 can determine that some data to be error corrected requires a different (e.g., higher level) of error correction (e.g., higher precision, etc.) than other data stored by the memory system 104. For example, the error correction component 106 can determine that a first unit of data (e.g., a managed unit, such as a block of data, a sector, one or more codewords, a page of data, etc.) is critical to performance of the computing system 100 and a second unit of data is less critical to performance of the computing system 100, and, based on this determination and latency information and/or the predicted health of the physical addresses associated with the data, perform different error correction operations.

As used herein, a "managed unit" (MU) generally refers to a number of memory cells that are programmed and/or read together or as a functional group. A managed unit may correspond to a logical block size (e.g., a data transfer size of a host and/or a data management size of a memory system), which can be, for example, 4 KB. As an example, a managed unit can be mapped to a physical block of memory cells. However, embodiments are not so limited. For example, a managed unit may correspond to more than a logical block size when a group of memory cells storing user data and overhead data (e.g., data informative of other data stored within the group of memory cells) corresponds to more than a logical block size. As an example, the overhead data may include data such as metadata, error correction code (ECC) data, logical block addresses (LBA) data as well as counters (e.g., read/write counters) associated with memory operations performed on a managed unit. In some embodiments, a MU can include multiple codewords. As used herein, a "codeword" generally refers to an element of an error correcting code. A codeword can, in some embodiments, be an independently encoded data block that is protected with a cyclic redundancy check (CRC).

The error correction component 106 can assign a higher error correction priority to the first unit of data and perform different levels of error correction operations on the first unit of data in response to the determination of latency information to assign a health of the data. Depending on the criticality of the second unit of data, in this example, the error correction component 106 can either perform an error correction operation on the second unit of data subsequent to performance of the error correction operation on the first unit of data or the error correction component 106 can instruct the memory device 104 to perform an error correction operation on the second unit of data in, for example, parallel with performance of the error correction operation on the first unit of data.

In some examples, the first level or error correction and the second level of error correction can be different. For example, the error correction component 106 can include ECC logic (e.g., hardware and/or firmware) to perform multi-levels of error correction operations according to schemes such as Hamming codes, RS codes, BCH codes, CRC codes, Golay codes, Reed-Muller codes, Goppa codes, neighbor-cell assisted error correction codes, LDPC error correction codes, and Denniston codes, and/or other type of error correction scheme for instance, or combinations thereof.

For example, the first level or error correction can be a BCH hard decoding with a read retry where iterations of the read operation can be repeated using various voltages. The second level of error correction can be a neighbor-cell assisted error correction. In other embodiments, the first level or error correction can be one or more iterations of LDPC hard decoding error correction operation, and a second level or error correction can be one or more iterations of LDPC soft decoding iterations. Further, the controller 110 can implement any quantity of error correction levels.

After the error correction component 106 has performed error correction operations (e.g., initial error correction operations and/or subsequent-error correction operations) on the data, the host 102 can use the error corrected data in performance of a host computing operation. Embodiments are not so limited, however, and in some embodiments, once the error correction component 106 has performed error correction operation(s) on the data, the error correction component 106 can cause the data to be transferred back to the memory devices 112, or the controller 110 can determine that the physical address locations associated with the data can be retired based on the latency information.

The controller 110 can communicate with the memory devices 112-1 to 112-P to control data read, write, and erase operations, among other operations. The controller 110 can include, for example, a number of components in the form of hardware and/or firmware, e.g., one or more integrated circuits, such as application-specific integrated circuit(s) (ASIC(s)), field-programmable gate array(s) (FPGA(s)), and/or software for controlling access to the number of memory devices 112-1 to 112-P and/or for facilitating data transfer between memory devices 112-1 to 112-P and the host 102. The controller 110 can include various components not illustrated so as not to obscure embodiments of the present disclosure to control data read, write, erase, etc. operations. Such components may not be components of controller 110 in some embodiments, e.g., the components to control data read, write, erase, etc. operations can be independent components located within the memory system 104.

The memory devices 112-1 to 112-P can include a number of arrays of memory cells. The arrays can be flash arrays with a NAND architecture, for example. However, embodiments are not limited to a particular type of memory array or array architecture. The memory cells can be grouped, for instance, into a number of blocks including a number of physical pages. A number of blocks can be included in a plane of memory cells and an array can include a number of planes.

The memory devices 112-1 to 112-P can include volatile memory and/or non-volatile memory. In a number of embodiments, memory devices 112-1 to 112-P can include a multi-chip device. A multi-chip device can include a number of different memory types and/or memory modules. For example, a memory system can include non-volatile or volatile memory on any type of a module. In embodiments in which the memory devices 112-1 to 112-P include non-volatile memory, the memory devices 112-1 to 112-P can be flash memory devices such as NAND or NOR flash memory devices.

Embodiments are not so limited, however, and the memory devices 112-1 to 112-P can include other non-volatile memory devices such as non-volatile random-access memory devices (e.g., NVRAM, ReRAM, FeRAM, MRAM, PCM), "emerging" memory devices such as resistance variable (e.g., 3-D Crosspoint (3D XP)) memory devices, memory devices that include an array of self-selecting memory (SSM) cells, etc., or combinations thereof. Resistance variable memory devices can perform bit storage based on a change of bulk resistance, in conjunction with a stackable cross-gridded data access array. Additionally, in contrast to many flash-based memories, resistance variable non-volatile memory can perform a write in-place operation, where a non-volatile memory cell can be programmed without the non-volatile memory cell being previously erased. In contrast to flash-based memories and resistance variable memories, self-selecting memory cells can include memory cells that have a single chalcogenide material that serves as both the switch and storage element for the memory cell.

The memory devices 112-1 to 112-P can provide main memory for the computing system 100 or can be used as additional memory or storage throughout the computing system 100. Each memory device 112-1 to 112-P can include one or more arrays of memory cells, e.g., volatile and/or non-volatile memory cells. The arrays can be flash arrays with a NAND architecture, for example. Embodiments are not limited to a particular type of memory device. For instance, the memory device can include RAM, ROM, DRAM, SDRAM, PCRAM, RRAM, and flash memory, among others.

Figure 2B:
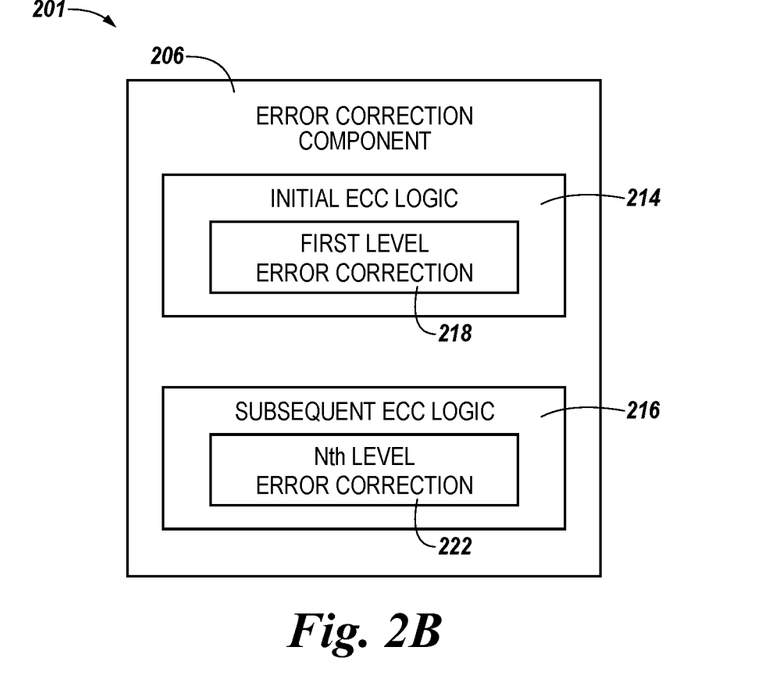
FIG. 2B is another functional block diagram in the form of an apparatus including an error correction component in accordance with a number of embodiments of the present disclosure.

FIGS. 2A and 2B are functional block diagrams in the form of apparatuses 201 including an error correction component 206 in accordance with a number of embodiments of the present disclosure. The error correction component 206 can be analogous to the error correction component 106 illustrated in FIG. 1, herein. As shown in FIG. 2A, the error correction component 206 can include an initial ECC logic 214 and a subsequent ECC logic 216. As shown in FIG. 2B, the initial ECC logic 214 further includes a first level error correction 218, while the subsequent ECC logic 216 further includes an $N^{th}$ level error correction 222. The error correction component 206 can be resident on (e.g., physically deployed on) a memory system, such as the memory system 104 illustrated in FIG. 1.

The initial ECC logic 214 and the subsequent ECC logic 216 can include, for example, a number of components in the form of hardware and/or firmware, e.g., one or more integrated circuits, such as application-specific integrated circuit(s) (ASIC(s)), field-programmable gate array(s) (FPGA(s)), and/or software for performing error correction operations on data transferred between a host (e.g., the host 102 illustrated in FIG. 1) and memory devices (e.g., the memory devices 112-1 to 112-P illustrated in FIG. 1).

The initial ECC logic 214 can be implemented as a BCH ECC and/or an iterative encoder/decoder such as an LDPC ECC encoder/decoder, or other suitable encoder to encode data received from a memory system as part of performance of an error correction operation on the received data. Similarly, the subsequent ECC logic 216 can be implemented as a BCH ECC encoder/decoder and/or an iterative encoder/decoder such as an LDPC encoder/decoder, or other suitable encoder/decoder to encode and/or decode data received from a memory system as part of performance of an error correction operation on the received data.

As described above, the error correction component 206 can receive data from a memory device (e.g., the memory devices 112-1 to 112-P illustrated in FIG. 1) and perform an error correction operation on the data. Performance of an error correction operation can include implementing one or more error correction codes to correct for errors in the data.

In some embodiments, the initial ECC logic 214 and/or the subsequent ECC logic 216 can implement multiple tiers of encoding and/or decoding. For example, the initial ECC logic 214 and/or the subsequent ECC logic 216 can include a first level error correction 218 and/or an $N^{th}$ level error correction 222. For example, the initial ECC logic 214 can include a first level error correction 218 in the form of a BCH code. Similarly, the subsequent ECC logic 216 can include an $N^{th}$ level error correction 222 in the form of an LDPC decoder. Embodiments of the present disclosure are not limited to the particular quantities and/or types of ECC set forth above, however, and can include additional ECC, and/or different types or ordering of ECC than those described above.

According to various embodiments of the present disclosure, the initial ECC logic 214 and/or the subsequent ECC logic 216 can selectively implement an all LDPC ECC scheme (e.g., using the initial ECC logic 214 and the subsequent ECC logic 216) or a tiered ECC scheme which has an initial BCH code (e.g., resulting in first level error correction 218), and an LDPC code and a subsequent LDPC code (e.g., resulting in the $N^{th}$ level error correction). In other examples, the initial ECC logic 214 and/or the subsequent ECC logic 216 can selectively implement an all BCH (or other ECC scheme) (e.g., using the initial ECC logic 214 and the subsequent ECC logic 216) or a tiered ECC scheme which has an initial BCH code (e.g., resulting in first level error correction 218), and a neighbor-cell assisted error correction (NAC) code and a subsequent NAC code (e.g., resulting in the $N^{th}$ level error correction). In the tiered ECC schemes described above, a BCH code, a LDPC, a NAC, and/or other ECC schemes can run for multiple iterations, for example. The residual errors can result in latency information which can prompt the controller (e.g., the controller 110 of FIG. 1) to predict a health of the data and/or the physical addresses associated with the data. Based on the prediction, the controller can take an action and/or escalate to a different level of error correction using a different ECC scheme.

In the above example, the controller can be configured to perform multiple iterations of the different error correction operations. The multiple iterations of error correction operations can be different techniques of error correction and latency information can be determined after each iteration of the subsequent error correction to predict a health of the data and/or the physical addresses associated with the data. In this way, the memory device can avoid storing data in physical address spaces that exhibit a higher likelihood of imparting uncorrectable errors to data stored therein, which can reduce a quantity of uncorrectable errors that are propagated through a computing system by taking an action (e.g., predicting an amount of wear corresponding to the physical address space associated with the data) based in part on the determined latencies. This can, in turn, allow for avoidance of reporting uncorrectable error to the host device.

The controller my implement any combination of ECC to comprise multiple tiers of ECC. For example, the error correction component 206 can comprise multiple ECC logics to provide multiple levels of error correction. As described above, examples of ECCs include, Hamming codes, RS codes, BCH codes, CRC codes, Golay codes, Reed-Muller codes, Goppa codes, neighbor-cell assisted error correction codes, LDPC error correction codes, and Denniston codes, among others, and the error correction component 206 can be configured to implement one or more of such ECCs in various orders as part of providing multiple tiers of ECC to data received by the error correction component 206.

The controller can escalate from a first level error correction 218 to a $N^{th}$ level error correction 222 based, at least in part, on latency information and/or the predicted health determined by the controller and based at least in part on the assignment of timestamps to iterations of the ECCs. For example, the controller can be configured to assign timestamps to each iteration of the multiple iterations of the different error correction operation, and determine a latency corresponding to the error correction logic (e.g., the initial ECC logic 214 and/or the subsequent ECC logic 216), based, at least in part, on the timestamps assigned to each operation of different error correction operations and an initial timestamp (when the data is received by the controller from the memory device e.g., memory device 112-1 to 112-P and/or the buffer 110 of FIG. 1 and/or when the data 315 is initially read). Based on determinations of latency information, the controller can take an action such as determine additional error correction operations that may be required, predict an amount of wear corresponding to the data, retiring a physical address corresponding to the data based on the amount of wear predicted, predict a remaining quantity of data transfer cycles left for the physical address locations corresponding to the data, or a combination thereof. Additionally, the controller can determine that the data is not correctable and report the uncorrectable data to the host (e.g., the host 102 of FIG. 1). Using these methods, the memory system (e.g., the memory system 100 of FIG. 1) can avoid the receipt of uncorrectable data.

Figure 3:
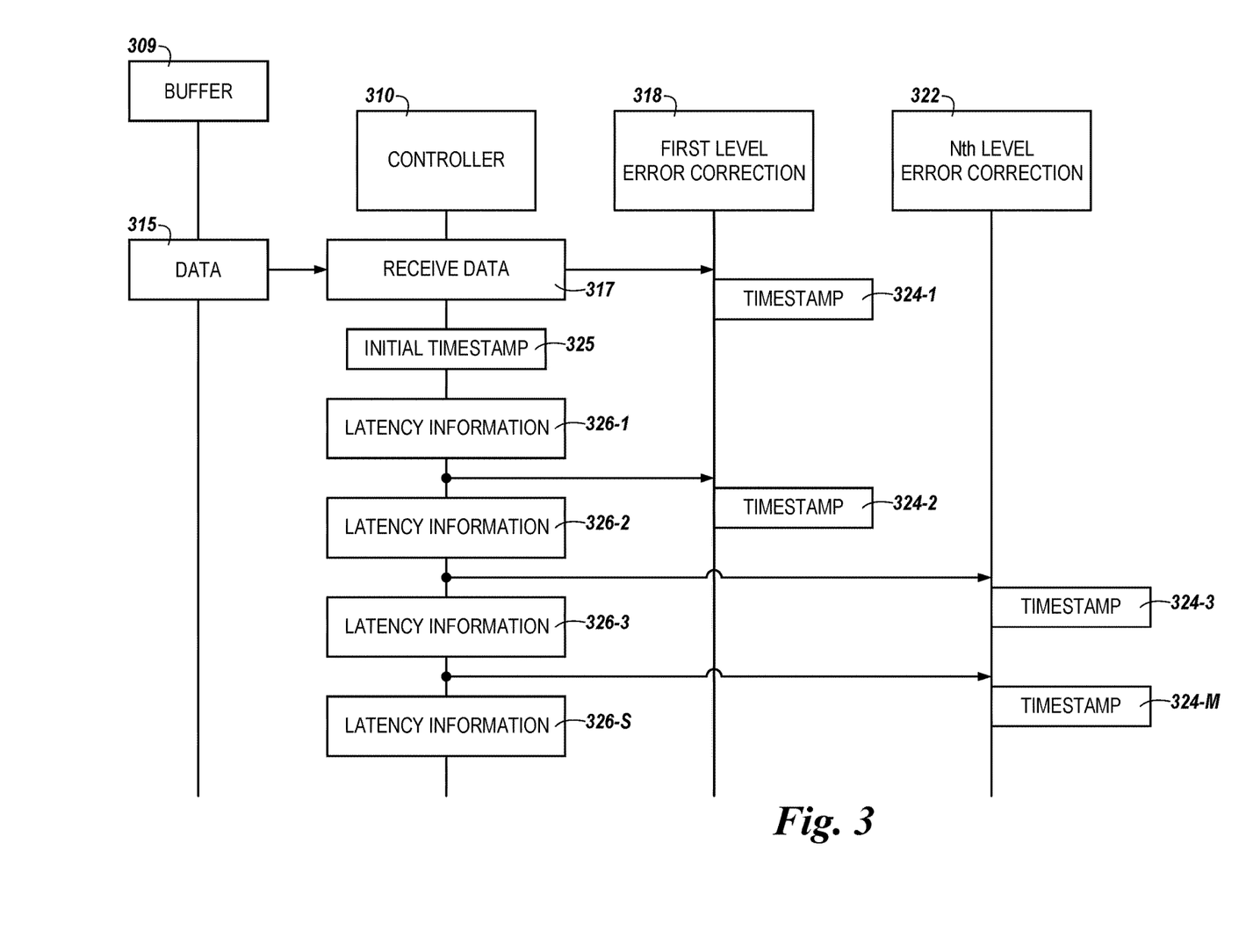
FIG. 3 is a flow diagram representing an example data and predictive memory management operations in accordance with a number of embodiments of the present disclosure.

FIG. 3 is a flow diagram representing example data 315 and predictive memory management operations in accordance with a number of embodiments of the present disclosure. FIG. 3 illustrates a buffer 309 and a controller 310 which can be analogous to the buffer 109 and the controller 110 described in connection with FIG. 1. FIG. 3 further illustrates a first level of error correction 318 and an $N^{th}$ level error correction 322, which can be included in an error correction component (e.g., the error correction component 106 described in connection with FIG. 1) and be analogous to the first level error correction 218 and the $N^{th}$ level error correction 222 described in connection with FIG. 2B.

The buffer 309, the controller 310, the first level of error correction 318, and the $N^{th}$ level error correction 322 can be a part of a computing system (e.g., the computing system 100 of FIG. 1). Although not illustrated here as to not obscure the examples of the disclosure, a host (e.g., the host 102 of FIG. 1) can be coupled to a memory system (e.g., the memory system 104 of FIG. 1), and the controller 310 can be resident on the memory system.

The data 315 can be stored in a memory device (e.g., the memory devices 112 of FIG. 1) and be buffered in the buffer 309 until it is read by the controller 310. For example, the controller 310 can be configured to receive the data 315 (at block 317) from a memory device via the buffer 309. The data 315 can correspond to an operation of the host. In some embodiments, the host can request the data 315 from the memory device to execute an operation.

The controller 310 can assign an initial timestamp 325 to the data 315. The initial timestamp 325 can be when the data is initially received from the buffer 309 and/or the memory device, and/or when the data 315 is initially read. To avoid reporting uncorrectable error being transferred to the host, the controller 310 can perform one or more error correction operations. For example, the controller 310 can be configured to perform one or more error correction operations at the first level of error correction 318. In some embodiments, the controller 310 can perform an initial error correction operation at differing respective discrete read voltages, and the initial error correction operation can correspond to a first level of error correction 318 on the data 315. The controller 310 can assign a timestamp 324-1 after an initial error correction operation performed on the data 315. The controller 310 can determine, based on the timestamp 324-1 and the initial timestamp 325, latency information 326-1.

The controller 310 can determine latency information e.g., latency information 326-1 associated with performing the plurality of initial error correction operations based on a period of time between performance of respective iterations at the respective discrete read voltages, and the initial timestamp 325. Based at least in part on the latency information 326-1, the controller 310 can predict a health of the data 315 (e.g., predict an amount of wear corresponding to the data 315) and take an action. For example, an action can be the controller 310 being configured to predict a remaining quantity of data transfer cycles left for the physical address locations corresponding to the data 315. Based on the action, the controller 310 can perform another iteration of the error correction operation using ECC logic corresponding to the first level or error correction 318. After the additional iteration of the error correction operation at the first level of error correction 318, the controller 310 can assign another timestamp 324-2 to determine another (e.g., different) latency information 326-2 based on the timestamp 324-2 and the initial timestamp 325.

As mentioned herein, the controller 310 can include error correction logic configured to perform the initial error correction operations, subsequent error correction operations, or both. Based on the latency information 326-2 determined from the timestamp 324-2, and subsequent predictions of the heath of the data 315 and/or wear, the controller 310 can determine to perform a subsequent error correction operation on the data 315 using ECC logic that corresponds to an $N^{th}$ level of error correction 322. After performing an iteration of the $N^{th}$ level error correction 322, the controller 310 can assign a timestamp 324-3 to determine latency information 326-3. The latency information 326-3 can be based on the timestamp 324-3 and the initial timestamp 325. The controller 310 can use the latency information 326-3 to determine health information for physical address locations corresponding to the data 315 based on the subsequent error correction operations performed at the $N^{th}$ level of error correction 322. In this way, the controller 310 can predict a health associated with the data 315 and/or predict an amount of wear corresponding to the data and take an action.

The controller 310 can perform multiple iterations of subsequent error correction operations. For example, based at least in part on the latency information 326-3 determined from the $N^{th}$ level error correction 322 operation that was assigned the timestamp 324-3, the controller can perform another iteration of subsequent error correction operations at the $N^{th}$ level of error correction 322. The controller 310 can assign a timestamp 324-M to the error correction operation at the $N^{th}$ level of error correction 322 and determine the latency information 326-S. The latency information 326-S can be based on the timestamp 324-M and the initial timestamp 325. The controller 310 can use the latency information 326-S to determine health information for physical address locations corresponding to the data 315 based on the subsequent error correction operations performed at the $N^{th}$ level of error correction 322. In this way, the controller 310 can predict a health associated with the data 315 and/or predict an amount of wear corresponding to the data and take an action.

For example, the controller 310 can take an action involving the physical address locations based, at least in part on the determined health information corresponding to the physical address locations. In some embodiments, the controller 310 can be configured to predict a remaining quantity of data transfer cycles left for the plurality of physical addresses, based at least in part on the latency information e.g., 326-S associated with the at least one subsequent error correction operation. Based on each latency information 326 determined, the controller 310 can assign a quantity of remaining data transfer cycles left for the physical addresses. The controller 310 can, in some embodiments, be configured to retire the plurality of physical addresses after the quantity of data transfer cycles has been completed. The multi-level error correction operation and predictive memory management can continue in this way until the controller 310 does not detect any additional error, and/or determines that the error is uncorrectable.

Figure 4:
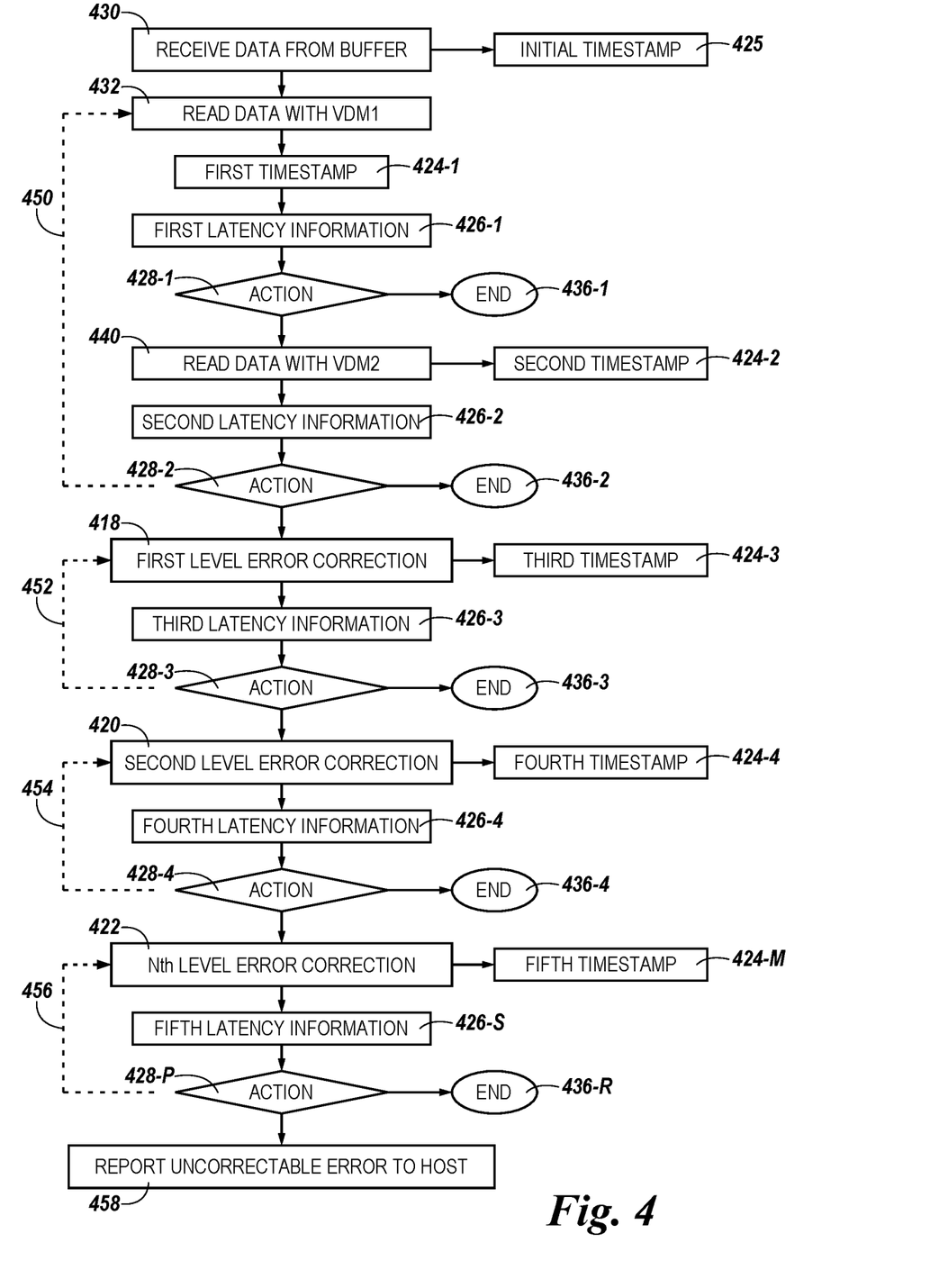
FIG. 4 is a flow diagram representing predictive memory management operations in accordance with a number of embodiments of the present disclosure.

FIG. 4 is a flow diagram representing predictive memory management operations in accordance with a number of embodiments of the present disclosure. FIG. 4 illustrates various levels of error correction, latency information corresponding to performance of the various levels of error correction, and timestamps assigned to iterations or error correction based on the latency information. FIG. 4 further illustrates a first level of error correction 418, a second level of error correction 420, and an $N^{th}$ level error correction 422, which can be included in an error correction component (e.g., the error correction component 106 described in connection with FIG. 1) and be analogous to the first level error correction 218 and the $N^{th}$ level error correction 222 described in connection with FIG. 2B.

In some embodiments, the first level of error correction 418, the second level of error correction 420, and the $N^{th}$ level of error correction 422 can be performed using at least one of a Bose-Chaudhuri-Hocquenghem (BCH) error correcting code, a neighbor-cell assisted error correction (NAC) code, or both, and a subsequent error correction operation can be performed using the NAC code, a memory protection error correction code, or both. In other embodiments, other error correction code schemes (e.g., Hamming codes, RS codes, etc.) may be used.

The buffer (e.g., the buffer 109 of FIG. 1), the controller (e.g., the controller 110 of FIG. 1), circuitry that performs the first level of error correction 418, the second level of error correction 420, and the $N^{th}$ level error correction 422 can be a part of a computing system (e.g., the computing system 100 of FIG. 1). Although not illustrated here as to not obscure the examples of the disclosure, a host (e.g., the host 102 of FIG. 1) can be coupled to a memory system (e.g., the memory system 104 of FIG. 1), and the controller can be resident on the memory system.

At 430, the controller can receive, from the memory device via the buffer, data corresponding to an operation of the host. In some embodiments, the controller can receive a request from the host for the data. The controller can assign an initial timestamp 425 to the data. The initial timestamp 425 can be assigned responsive to the data received from the buffer and/or the memory device, or the initial timestamp 425 can correspond to the controller beginning a read operation on the data received from the buffer and/or the memory device. The controller can be configured to adjust respective discrete read voltages (e.g., VDMs) applied to the data during a read operation.

As used herein, a "discrete read voltage" or "VDM" generally refers to a demarcation voltage which may be applied across the terminals of a memory cell when sensing the state of a memory cell. The state of the memory cell may be sensed based on the reaction of the memory cell to the applied discrete read voltage. For example, the memory cell may either go into a conductive ON state (logic one) or remain in a weakly conductive OFF state (logic zero). The applied voltage at which a memory cell transitions from being sensed as a logic one to being sensed as a logic zero may be termed a threshold voltage of the memory cell. Thus, as an example, when the VDM is higher than the threshold voltage of the memory cell, the memory cell may be sensed as storing a logic one and when the VDM is lower than the threshold voltage of the memory cell, the memory cell may be sensed as storing a logic zero.

At 432 the controller can be configured to read the data with a first discrete read voltage (VDM1) and record a first timestamp 424-1, where the first timestamp 424-1 corresponds to completion of the first read by the controller. The controller can determine a first latency information 426-1 based on the first timestamp 424-1 and the initial timestamp 425. The latency information can be used by the controller to predict a health of the data. The latency information e.g., latency information 426-1, can be used to predict whether data is uncorrectable or corrupt. The latency information e.g., the latency information 426-1 can be used to prevent reporting of uncorrectable data to a host. The controller can take an action at block 428-1 involving the physical address locations, based, at least in part on the determined latency information 424-1 corresponding to the health of the physical address locations corresponding to the data.

Taking an action can include determining that a physical address location or multiple physical address locations corresponding to the data is degraded based at least in part on the latency information, and at block 436-1 ending the read operation. In another embodiment, taking an action can include predicting an amount of wear corresponding to the data, and retiring a physical address location corresponding to the data, based in part on the amount or wear predicted. In another embodiment, taking an action can include predicting a remaining quantity of data transfer cycles left for the plurality of address locations, based at least in part on the latency information. Predicting the remaining quantities of data transfer cycles can include retiring the physical address locations following the last data transfer cycle. If there is not an error, the read operation ends at 436-1. If the controller determines that the action to be taken is to retire the physical address locations corresponding to the data, the read operation ends at 436-1.

In some embodiments, when the controller determines that there is an error in the data, and the controller determines that the data is healthy enough to proceed with error correction operations, the controller can adjust the discrete read voltage and attempt to read the data. At 440, the controller can read the data with a second discrete read voltage (VDM2) and record a second timestamp 424-2. The controller can determine a second latency information 426-2, based, at least in part, on the initial timestamp 425 and the second timestamp 424-2.

Based on the second latency information 426-2 the controller can take an action at 428-2 if physical address locations are retired, or if the controller determines that there is no longer error in the data, the operation can end at 436-2 and the data can be transmitted to the host and/or saved in the computing device.

In some embodiments, the controller can be configured to repeat read iterations as indicated by the arrow 450 for a number of iterations until it is determined that the data does not contain errors, or until a particular quantity of iterations have been performed which can be determined by the health of the data based on the latency information. The controller can be further configured to adjust the respective discrete read voltages of the read operations, initial error correction operations, and/or subsequent error correction operations, based at least in part on the latency information associated with performing the plurality of read operations at the respective discrete read voltages and/or error correction operations. The controller can be configured to change the voltage for each iteration, or the voltage can be kept the same.

For example, the controller can perform one or more initial error correction operations at differing respective discrete read voltages, where the one or more initial error correction operations correspond to a first level of error correction on the data. Specifically, the controller can apply an error correction operation corresponding to a first level of error correction 418. The controller can assign a third timestamp 424-3 and use the third timestamp 424-3 together with the initial timestamp 425 to determine a third latency information 426-3. The third latency information 426-3 can be used to predict a health of the data.

Based on the third latency information 426-3 the controller can take an action at 428-3 and if physical address locations are retired, or if the controller determines that there is no longer error in the data, the operation can end at 436-3 and the data can be transmitted to the host and/or saved in the computing device.

The controller may determine that there is residual error in the data and based on the determined health of the data, the controller can repeat the initial error correction operation corresponding to the first level of error correction 418 as indicated by the arrow 452. In other embodiments, the controller can determine that health of the data is sufficient and/or a predicted quantity of data transfer cycles has not been reached such that more iterations of the initial error correction operations are allowed to be performed and/or the controller can perform one or more subsequent error correction operations that correspond to a second level of error correction on the data based, at least in part, on the predicted health of the data (e.g., the third latency information 426-3).

For example, the controller can perform one or more subsequent error correction operations at differing respective discrete read voltages, where the one or more subsequent error correction operations correspond to a second level of error correction on the data. Specifically, the controller can apply an error correction operation corresponding to a second level of error correction 420. The controller can assign a fourth timestamp 424-4 and determine if there is residual error in the data. The controller can assign the fourth timestamp 424-4 and use the fourth timestamp 424-4 together with the initial timestamp 425 to determine a fourth latency information 426-4. The fourth latency information 426-4 can be used to predict a health of the data.

Based on the fourth latency information 426-4 the controller can take an action at 428-4 and if physical address locations are retired, or if the controller determines that there is no longer error in the data, the operation can end at 436-4 and the data can be transmitted to the host and/or saved in the computing device.

The controller may determine that there is residual error in the data and based on the determined health of the data, the controller can repeat the subsequent error correction operation corresponding to the second level of error correction 420 as indicated by the arrow 454. In other embodiments, the controller can determine that health of the data is good enough and/or a predicted quantity of data transfer cycles has not been reached such that more iterations of the subsequent error correction operations are allowed to be performed and/or the controller can perform one or more subsequent error correction operations that correspond to a $N^{th}$ level of error correction on the data based, at least in part, on the predicted health of the data (e.g., the fourth latency information 426-4).

For example, the controller can perform one or more (additional) subsequent error correction operations at differing respective discrete read voltages, where the one or more subsequent error correction operations correspond to a Nth level of error correction on the data. Specifically, the controller can apply an error correction operation corresponding to a $N^{th}$ level of error correction 422. The controller can assign a fifth timestamp 424-M and determine if there is residual error in the data. The controller can assign the fifth timestamp 424-M and use the fifth timestamp 424-M together with the initial timestamp 425 to determine a fifth latency information 426-S. The fifth latency information 426-5 can be used to predict a health of the data.

Based on the fifth latency information 426-5 the controller can take an action at 428-P and if physical address locations are retired, or if the controller determines that there is no longer error in the data, the operation can end at 436-R and the data can be transmitted to the host and/or saved in the computing device.

The controller may determine that there is residual error in the data and based on the determined health of the data, the controller can repeat the subsequent error correction operation corresponding to the $N^{th}$ level of error correction 422 as indicated by the arrow 456. In other embodiments, the controller can determine that health of the data is good enough and/or a predicted quantity of data transfer cycles has not been reached such that more iterations of the subsequent error correction operations are allowed to be performed and/or the controller can perform one or more subsequent error correction operations that correspond to the $N^{th}$ level of error correction on the data based, at least in part, on the predicted health of the data (e.g., the fourth latency information 426-4).

In incidences where the error is not correctable, or the controller determines the health of the data to be insufficient, the controller (at 458) can report the uncorrectable error to the host and/or the computing system. In this way, the memory device can refrain from transmitting uncorrectable data to the host.

Figure 5:
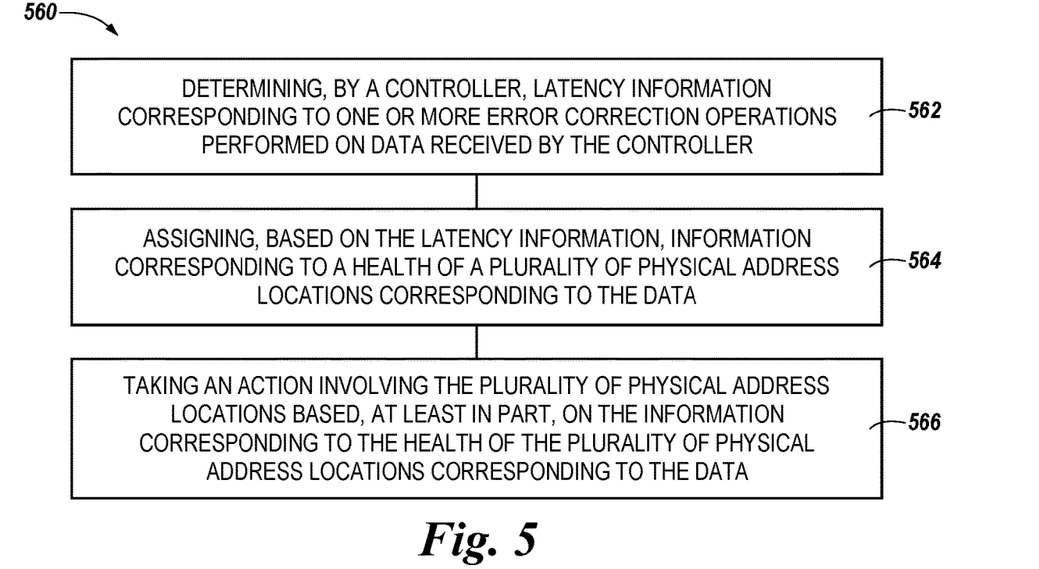
FIG. 5 is a flow diagram representing an example method for predictive memory management in accordance with a number of embodiments of the present disclosure.

FIG. 5 is a flow diagram representing an example method 560 for predictive memory management in accordance with a number of embodiments of the present disclosure. At block 562, the method 560 can include determining, by a controller (e.g., the controller 110 of FIG. 1), latency information corresponding to one or more error correction operations performed on data received by the controller. The latency information can be used to predict a health of the data and/or the physical address locations corresponding to the data The latency information can be determined from timestamps assigned to the data after error correction operations. An initial timestamp (e.g., the initial timestamp 325 of FIG. 3 or the initial timestamp 425 of FIG. 4) can be assigned when the data is received from the memory device (e.g., the memory devices 112 and/or the buffer 109 of FIG. 1), or when the controller initiated a read operation on the data. In some embodiments, the method 560 can include assigning, by the controller, a first timestamp (e.g., the first timestamp 324-1 of FIG. 3 or 424-1 of FIG. 4) to an iteration of the error correction operation that provides a first level (e.g., the first level of error correction 318) of error correction; and determining, by the controller, to perform a subsequent iteration of the error correction operation that provides the first level of error correction, on the data, based at least in part on the latency information determined from the first timestamp and/or the initial timestamp. Additional timestamps can be assigned to subsequent iterations of error correction operations.

For example, the method 560 can further include assigning, by the controller, a second timestamp (e.g., the second timestamp 324-2) to the subsequent iteration of the error correction operation that provides the first level of error correction; and determining, by the controller, the latency information based, at least in part, on the second timestamp; and assigning the information corresponding to the health of the plurality of physical address locations, based on the latency information determined from the second timestamp and/or the initial timestamp. The controller can assign health information to the data based on each determined latency information.

For example, the method 560, at block 564, can include assigning, based on the latency information, information corresponding to a health of a plurality of physical address locations corresponding to the data. In some embodiments, the controller can take an action based on the latency information. The method 560, at block 566, can include assigning, based on the latency information, information corresponding to a health of a plurality of physical address locations corresponding to the data. Such actions can include, predicting an amount of wear corresponding to the data and retiring a physical address corresponding to the data, based in part on the amount of wear predicted; determining that a physical address location corresponding to the data is degraded, and retiring the physical address location based on that determination of wear; and/or predicting a remaining quantity of data transfer cycles left for the physical address locations, and retiring the plurality of physical address locations following the last data transfer cycle of the quantity of data transfer cycles. In the embodiment in which the health of the data is good, or when there are multiple data transfer cycles left, the controller may determine to perform error correction operations at different levels.

For example, the method 660 can include assigning, by the controller, second latency information (e.g., latency information 326-3 of FIG. 3) to an iteration of the error correction operation that provides a second level of error correction (e.g., the $N^{th}$ level of error correction 322 of FIG. 3), where the second latency information is based on a timestamp (e.g., the timestamp 324-3 of FIG. 3) and/or the initial timestamp 325; and determining, by the controller, to perform a subsequent iteration of the error correction operation that provides the second level of error correction, on the data, based at least in part on the second latency information.

For example, the method 660 can include assigning, by the controller, a different timestamp (e.g., the timestamp 324-M of FIG. 3) to the subsequent iteration of the error correction operation that provides the second level of error correction; and determining, by the controller, new latency information (e.g., the latency information 326-S) based, at least in part, on the different timestamp and/or the initial timestamp; and assigning and/or updating the information corresponding to the health of the plurality of physical addresses, based on the new latency information determined from the different timestamp.

Figure 6:
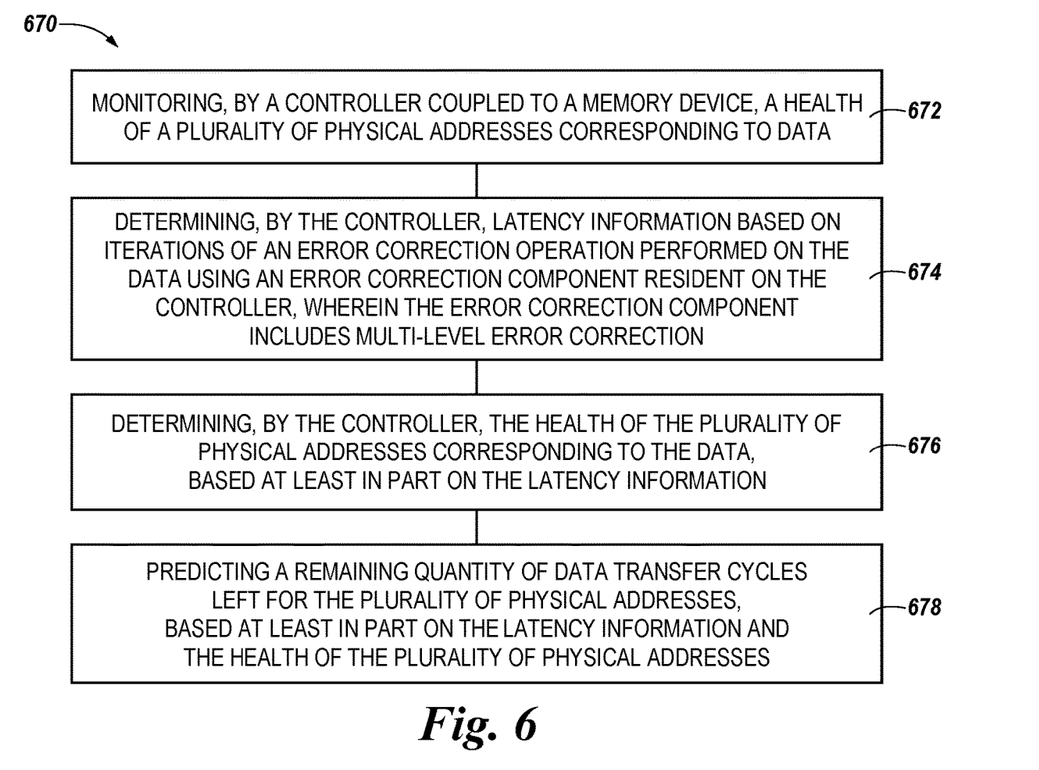
FIG. 6 is a flow diagram representing another example method for predictive memory management in accordance with a number of embodiments of the present disclosure.

FIG. 6 is a flow diagram representing an example method 670 for predictive memory management in accordance with a number of embodiments of the present disclosure. At block 672, the method 670, can include monitoring, by a controller (e.g., the controller 110 of FIG. 1) coupled to a memory device (e.g., the memory device 112 of FIG. 1), a health of physical addresses corresponding to data. The controller can monitor data requests from a host (e.g., the host 102 of FIG.

1) and determine if the data requires error correction operations prior to transmissions the host.

At block 674, the method 670 includes determining, by the controller, latency information based on iterations of an error correction operation performed on the data using an error correction component resident on the controller, wherein the error correction component includes multi-level error correction using an error correction component (e.g., error correction component 106 of FIG. 1). The error correction component can include error correction logic (e.g., the initial ECC logic 214 of FIGS. 2A and 2B) resident on the controller, and an error correction operation can provide a multiple levels of error correction (e.g., the first level of error correction 218 and $N^{th}$ level of error correction 222 of FIG. 2) on the data. The method 670 can include assigning timestamps to iterations of the error correction operations to determine a latency information to determine a health of the data.

For example, at block 676, the method 670 includes determining, by the controller, the health of the physical addresses corresponding to the data, based at least in part on the latency information. The controller can use the latency information to take an action that may prevent reporting uncorrectable data to the host. For example, at block 678, the method 670 includes predicting a remaining quantity of data transfer cycles left for the physical addresses, based at least in part on the latency information and the health of the plurality of physical addresses.

The latency information can be determined by the controller after each iteration of error correction. For example, the method 670 can include receiving, by the controller, latency information corresponding to the error correction operation that provides a first level of error correction; and determining, by the controller, the health of the plurality of physical addresses corresponding to the data, based on the latency information corresponding to the error correction operation that provides the first level of error correction. The controller can determine the remaining quantity of data transfer cycles after the first level of error correction.

For example, the method 670 can include determining, by the controller, the remaining quantity of data transfer cycles; performing, using the error correction component, an error correction operation that provides a second level of error correction on the data based, at least in part, on the latency information corresponding to the error correction operation that provides the first level of error correction and the health of the physical addresses corresponding to the data; and determining, by the controller, latency information corresponding to the error correction operation that provides the second level of error correction. Further, the controller can determine the remaining quantity of data transfer cycles after the first second level of error correction.

For example, the method 670 can include determining the remaining quantity of data transfer cycles; and performing, using the error correction component, an error correction operation that provides a third level of error correction on the data based, at least in part, on the latency information corresponding to the error correction operation that provides the second level of error correction and the health of the physical addresses corresponding to the data; and determining, by the controller, latency information corresponding to the error correction operation that provides the third level of error correction. Further, the controller can determine the remaining quantity of data transfer cycles after the third level of error correction.

For example, the method 670 can include determining the remaining quantity of data transfer cycles; refraining from performing subsequent error correction iterations based, at least in part, on the latency information, the health of the plurality of physical addresses corresponding to the data, or both; and retiring, by the controller, the plurality of physical addresses corresponding to the data based, at least in part, on the latency information, the health of the plurality of physical addresses corresponding to the data, the remaining quantity of data transfer cycles falling below a threshold quantity of data transfer cycles, or combinations thereof.

Although specific embodiments have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the one or more embodiments of the present disclosure includes other applications in which the above structures and processes are used. Therefore, the scope of one or more embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method, comprising:
   determining, by a controller, latency information corresponding to one or more error correction operations performed on data received by the controller;
   assigning, based on the latency information, information corresponding to a health of a plurality of physical address locations corresponding to the data;
   predicting, based on the latency information or the information corresponding to the health of the plurality of physical address locations, an amount of wear corresponding to a physical address location of the plurality of physical address locations corresponding to the data;
   assigning a quantity of remaining data transfer cycles based on the predicted health of the physical address location of the plurality of physical address locations; and
   retiring, by the controller, the physical address location of the plurality of physical address locations corresponding to the data based, at least in part, on the latency information, the health of the physical address location of the plurality of physical address locations corresponding to the data, and the remaining quantity of data transfer cycles falling below a threshold quantity of data transfer cycles.

2. The method of claim 1, further comprising retiring the physical address location corresponding to the data, based in part on a predicted amount of wear corresponding to a physical address location corresponding to the data.

3. The method of claim 1, further comprising:
  determining that a physical address location of the plurality of physical address locations is degraded based at least in part on the latency information; and
  retiring the physical address location from operation.

4. The method of claim 1, further comprising predicting the remaining quantity of data transfer cycles left for the plurality of physical address locations, based at least in part on the latency information.

5. The method of claim 4, wherein predicting the remaining quantity of data transfer cycles includes retiring the plurality of physical address locations following a last data transfer cycle of the quantity of data transfer cycles.

6. The method of claim 1, further comprising:
  assigning, by the controller, a first timestamp to an iteration of the error correction operation that provides a first level of error correction; and
  determining, by the controller, to perform a subsequent iteration of the error correction operation that provides the first level of error correction, on the data, based at least in part on the latency information determined from the first timestamp.

7. The method of claim 6, further comprising:
  assigning, by the controller, a second timestamp to the subsequent iteration of the error correction operation that provides the first level of error correction; and
  determining, by the controller, the latency information based, at least in part, the second timestamp; and
  assigning the information corresponding to the health of the plurality of physical address locations, based on the latency information determined from the second timestamp.

8. The method of claim 1, further comprising:
  assigning, by the controller, second latency information to an iteration of the error correction operation that provides a second level of error correction, wherein the second latency information is based on a timestamp; and
  determining, by the controller, to perform a subsequent iteration of the error correction operation that provides the second level of error correction, on the data, based at least in part on the second latency information.

9. The method of claim 8,
  assigning, by the controller, a different timestamp to the subsequent iteration of the error correction operation that provides the second level of error correction; and
  determining, by the controller, new latency information based, at least in part, on the different timestamp; and
  assigning the information corresponding to the health of the plurality of physical address locations, based on the new latency information determined from the different timestamp.

10. A method, comprising:
  monitoring, by a controller coupled to a memory device, a health of a plurality of physical addresses corresponding to data;
  determining, by the controller, latency information based on iterations of an error correction operation performed on the data using an error correction component resident on the controller, wherein the error correction component includes multi-level error correction;
  determining, by the controller, the health of the plurality of physical addresses corresponding to the data, based at least in part on the latency information;
  predicting a remaining quantity of data transfer cycles left for the plurality of physical addresses, based at least in part on the latency information and the health of the plurality of physical addresses by predicting an amount of wear corresponding to a physical address location of the plurality of physical address locations corresponding to the data;
  retiring the physical address location of the plurality of physical address locations based on a determined likelihood that the physical address location will exceed a threshold predicted wear level within subsequent data cycles; and
  retiring, by the controller, the physical address location of the plurality of physical addresses corresponding to the data based, at least in part, on the latency information, the health of the physical address location of the plurality of physical addresses corresponding to the data, and the remaining quantity of data transfer cycles falling below a threshold quantity of data transfer cycle.

11. The method of claim 10, further comprising:
  receiving, by the controller, latency information corresponding to the error correction operation that provides a first level of error correction; and
  determining, by the controller, the health of the plurality of physical addresses corresponding to the data, based on the latency information corresponding to the error correction operation that provides the first level of error correction.

12. The method of claim 11, further comprising:
  determining the remaining quantity of data transfer cycles;
  performing, using the error correction component, an error correction operation that provides a second level of error correction on the data based, at least in part, on the latency information corresponding to the error correction operation that provides the first level of error correction and the health of the plurality of physical addresses corresponding to the data; and
  determining, by the controller, latency information corresponding to the error correction operation that provides the second level of error correction.

13. The method of claim 12, further comprising:
  determining the remaining quantity of data transfer cycles; and
  performing, using the error correction component, an error correction operation that provides a third level of error correction on the data based, at least in part, on the latency information corresponding to the error correction operation that provides the second level of error correction and the health of the plurality of physical addresses corresponding to the data; and
  determining, by the controller, latency information corresponding to the error correction operation that provides the third level of error correction.

14. The method of claim 10, further comprising:
  determining the remaining quantity of data transfer cycles;
  refraining from performing subsequent error correction iterations based, at least in part, on the latency information, the health of the plurality of physical addresses corresponding to the data, or both; and
  retiring, by the controller, the plurality of physical addresses corresponding to the data based, at least in part, on the latency information, the health of the plurality of physical addresses corresponding to the data, the remaining quantity of data transfer cycles falling below a threshold quantity of data transfer cycles, or combinations thereof.

15. An apparatus, comprising:
a controller coupled to a memory device, the controller including an error correction component resident thereon, wherein the controller is configured to:
  perform, using the error correction component, an initial error correction operation on data corresponding to a plurality of physical address locations of the memory device;
  assign a first timestamp to the initial error correction operation;
  perform, using the error correction logic, a subsequent error correction operation;
  assign a second timestamp to the subsequent error correction operation;
  determine latency information corresponding to the initial and subsequent error correction operations, based, at least in part, on the first and the second timestamp operation;
  assign, based on the latency information, information corresponding to a health of the plurality of physical address locations corresponding to the data;
  assign a quantity of remaining data transfer cycles based on the health information of the plurality of physical address locations corresponding to the data;
  retire the plurality of physical address locations corresponding to the data based on a determined likelihood that the plurality of physical address locations corresponding to the data will exceed a threshold predicted wear level within subsequent data cycles; and
  retire, by the controller, the plurality of physical addresses locations corresponding to the data based, at least in part, on the latency information, the health of the plurality of physical addresses locations corresponding to the data, and the remaining quantity of data transfer cycles falling below a threshold quantity of data transfer cycles.

16. The apparatus of claim 15, wherein the latency information is associated with a residual bit error rate (RBER).

17. The apparatus of claim 15, wherein latency information is determined after each subsequent error correction operation, and the health of the plurality of physical address locations is determined based in part on the latency information determined after each subsequent error correction operation.

18. The apparatus of claim 15, wherein the controller is further configured to:
  determine that the information corresponding to the health of the plurality of physical address locations is indicative of one or more of the plurality of physical address locations experiencing a failure within a particular quantity of subsequent data cycles; and
  retire the plurality of physical address locations based on a determined likelihood that the one or more of the plurality of physical address locations will experience the failure within the particular quantity of subsequent data cycles of the assigned health information.

19. A system, comprising:
a host; and
a memory system coupled to the host, the memory system comprising a controller resident on the memory system, wherein the controller is configured to:
  receive, from a memory device, data corresponding to an operation of the host;
  perform a plurality of initial error correction operations at differing respective discrete read voltages, wherein the plurality of initial error correction operations correspond to a first level of error correction on the data;
  determine latency information associated with performing the plurality of initial error correction operations based on a period of time between performance of respective iterations at the respective discrete read voltages;
  perform at least one subsequent error correction operation that corresponds to a second level of error correction on the data based, at least in part, on the determined latency information;
  determine latency information associated with performing the at least one subsequent error correction operation based on a period of time consumed in performing respective error correction operations of the at least one subsequent error correction operation;
  determine health information for physical address locations corresponding to the data based on a quantity of subsequent error correction operations performed;
  assign a quantity of remaining data transfer cycles based on the health information of the plurality of physical address locations corresponding to the data;
  retire the plurality of physical address locations corresponding to the data based on a determined likelihood that the plurality of physical address locations corresponding to the data will exceed a threshold predicted wear level within subsequent data cycles; and
  retire, by the controller, the plurality of physical address locations corresponding to the data based, at least in part, on the latency information, the health of the plurality of physical address locations corresponding to the data, and the remaining quantity of data transfer cycles falling below a threshold quantity of data transfer cycles.

20. The system of claim 19, wherein the controller is further configured to predict a remaining quantity of data transfer cycles left for the plurality of physical addresses, based at least in part on the latency information associated with the at least one subsequent error correction operation.

21. The system of claim 20, wherein the controller is further configured to assign a quantity of remaining quantity of data transfer cycles left for the plurality of physical addresses, based at least in part on the predicted remaining quantity of data transfer cycles left for the plurality of physical addresses.

22. The system of claim 21, wherein the controller is further configured to retire the plurality of physical addresses after the quantity of data transfer cycles has been completed.

* * * * *